United States Patent Office 3,551,380
Patented Dec. 29, 1970

3,551,380
PRODUCTION OF POLYESTERETHERS
Hidehiko Kobayashi and Kiichiro Sasaguri, Tokyo, Hiroshi Komoto, Saitama-ken, and Sukeo Kawashima and Noboru Tanimura, Tokyo, Japan, assignors to Asahi Kasei Kogyo Kabushiki Kaisha, Osaka, Japan, a corporation of Japan
No Drawing. Filed Oct. 9, 1967, Ser. No. 673,967
Claims priority, application Japan, Oct. 21, 1966, 41/68,955; Apr. 6, 1967, 42/21,482, 42/21,485; Apr. 10, 1967, 42/22,402
Int. Cl. C08g 23/16
U.S. Cl. 260—45.7     7 Claims

ABSTRACT OF THE DISCLOSURE

The production of linear polyesterethers containing at least 90 mole percent of the unit of the formula;

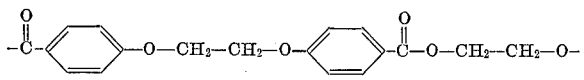

based upon the recurring unit in the molecular chain, comprising adding 1,2-bis(p-carboxy-phenoxy)ethane to 1,2-bis[p-($\beta$ - hydroxycarboethoxy)phenoxy]ethane in such amounts as to provide the mole ratio of

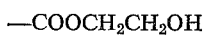

to —COOH being 1.0 to 4.0, heating the obtained mixture at a temperature of from 250 to 300° C. under a pressure of from the atmospheric pressure to 30 kg./cm.$^2$ to approximate the said mole ratio of above 1 to 1 as much as possible and polycondensing the obtained reaction product at elevated temperatures under reduced pressures in the absence of any polycondensation catalyst.

---

This invention relates to a process for producing linear polyesterethers containing at least 90 mole percent of the unit of the formula;

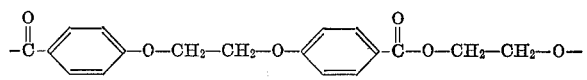

based on the recurring unit in the molecular chain.

Such polyesterethers have been produced by the polycondensation reaction at high temperatures under high vacuum with the use of a polycondensation catalyst, of the ester exchange reaction product of a lower alkyl ester of 1,2-bis(p-carboxyphenoxy)ethane with ethyleneglycol, or of the direct esterification reaction product of 1,2-bis(p-carboxyphenoxy)ethane with ethyleneglycol.

Metal salts or metal oxides employed as catalyst in these known processes promote not only the polycondensation but also the random scission of the ester-linkages in the molecular chain and introduce discoloration into the final polymer products. Further these metal catalysts present in the final polymer products promote a thermal and oxidative degradation in the course of a melt spinning. Consequently it is usually required to add a stabilizer for blocking these metal compounds in the polycondensation process. Such stabilizers include phosphorus compounds. The addition of such stabilizers reduces the activity of polycondensation catalysts and limits the kind of catalysts to be used. Additionally the presence of such metal compounds in the melt shaped articles introduces a color such as grey characteristic of the metal ions and this discoloration is a fatal disadvantage in the fabric or textile field and cannot be removed by a bleaching or scoring process. In producing films, the remaining inorganic compounds reduce the transparency to light of the film. Thus the polymeric products prepared with the use of a polycondensation catalyst have an inferior market standing and suffer from an economic competitive disadvantage.

It will be easily understood that the polycondensation reaction process for producing above-described polyesterethers by various methods consists substantially of the de-ethyleneglycolization reaction and the ester exchange reaction and proceeds in the absence of a polycondensation catalyst by positively eliminating the produced ethyleneglycol out of the reaction system, considering that the equilibrium constant of the reactions is relatively small. However, a long polycondensation time is required for producing a fiber-forming, high molecular weight polymer without the use of the catalyst. According to U.S. Pat. No. 2,739,957 and other literature, the addition of a polycondensation catalyst is an indispensable condition for producing fiber-forming linear polyesterethers in a reasonable period.

One object of this invention is the polycondensation of 1,2 - bis[p - ($\beta$ - hydroxycarboethoxy)phenoxy]ethane (hereinafter abbreviated as "BHCE") and 1,2-bis(p-carboxyphenoxy)ethane (hereinafter abbreviated as "BCE") which avoid the prior art difficulties.

Another object of this invention is a process for the production of polyesterethers.

It is another object of this invention to provide a novel process for polycondensing BHCE and BCE without utilizing any polycondensation catalyst.

Other and additional objects of this invention will become apparent from a consideration of this entire specification including the claims hereof.

In accord with and fulfilling these objects, there is provided a process for producing linear polyesterethers containing at least 90 mole percent of the unit of the formula;

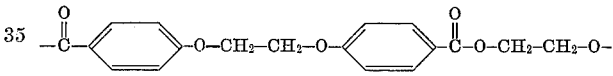

based on the recurring unit in the molecular chain, which comprises adding BCE to BHCE in such amounts as to provide the mole ratio of —COOCH$_2$CH$_2$OH to —COOH of about 1 to 4, heating the resulting mixture at a temperature of from 250 to 300° C. under a pressure of from about atmospheric pressure to about 30 kg./cm.$^2$ to approximate said mole ratio of above 1 to 1 as much as possible; and subsequently subjecting the resulting reaction product to polycondensation reaction at elevated temperatures under reduced pressures.

The BHCE of this process is prepared by the reaction of BCE with ethylene oxide or by the direct esterification of BCE or by the ester exchange reaction of BCE with ethyleneglycol. For example, 1.2 to 5.0 moles of ethyleneglycol, based on the BCE, is added to BCE and the obtained mixture is held at a temperature of from 200 to 300° C. under a presure of 1 to 80 kg./cm.$^2$, preferably 2 to 50 kg./cm.$^2$ to give BHCE or a mixture of BHCE and the lower condensates thereof. The reaction time depends upon a consideration of the amount of ethyleneglycol, the reaction temperature and the pressure. Usually the reaction is completed in about 10 hours, mostly in about 3 to 5 hours. It is preferred to positively remove the produced water, but this process introduces many difficulties and is not necessarily required. Also, at most 40% of the terminal carboxy group in BCE may remain unreacted for practising the present invention.

On the other hand, 2.0 to 10.0 moles of ethyleneglycol, based on the BCE, is added to BCE and the obtained mixture is subjected to a known ester exchange reaction at a temperature of from 160 to 230° C. in some cases to 300° C. so as to give at least 90% of BHCE and there is obtained a mixture of BHCE and the lower condensates thereof.

In carrying out this reaction, known ester exchange catalysts may be employed and exemplary ester exchange catalysts include metals such as lithium, sodium, potassium, calcium, magnesium, zinc, cadmium, chromium, manganese, nickel and cobalt, and alcoholates, carbonates, oxides, hydrides, acetates and borates thereof, and such compounds are added to the reaction. The time required for the ester exchange reaction depends upon a consideration of the amount of ethyleneglycol, the reaction temperature and pressure. The reaction is completed in about 10 hours, preferably about 3 to 5. It is preferred to positively remove the produced lower alcohol or glycol from the reaction system.

The BHCE thus prepared by the above-said ester exchange reaction or direct esterification reaction does not necesarily contain BHCE alone but may also contain the lower condensates of BHCE as well. BHCE may also be prepared by the reaction of BCE with ethyleneoxide.

It has been discovered that the purity and the crystalline form of BHCE have an effect on the polymerization of BHCE. Depending upon the type of impurity or impurities contained, BHCE of a higher purity has greater polymerizability.

In carrying out the present invention advantageously, BHCE is preferably purified at least so as to have the following molecular absorption coefficient $k$ with the wave lengths of 258 and 280 m$\mu$ in the ultraviolet range;

$$k_{258} = (4.48 \pm 0.20) \times 10^4 \text{ (l. cm./mole)}$$
and
$$k_{280} = (4.04 \pm 0.20) \times 10^3 \text{ (l. cm./mole)}$$

This $k$ value is determined from the transmittance T measured with the device EPU–2A type (Kabushiki Kaisha Hitachi Seisakusho) with the use of the following equation;

$$k = (\log_{10} T)/c.d$$

(wherein $d$ (cm.) is the thickness of the given material; $c$ (mole/l.) is the concentration represented by the numbers of moles of a solute in 1 liter of a solution with the use of dichloroethane as solvent). Regarding the crystalline form, BHCE has two stable forms in general i.e. $\alpha$-type and $\delta$-type. It has been discovered that BHCE has another crystalline modification differing from the both types which is obtained by treatng BHCE with dichloroethane or ethyleneglycol. This modification may be referred to as $\alpha$-$\delta$-type. These three types are distinguished with one another particularly by their characteristic infrared absorptions at 1720 and 1698 cm.$^{-1}$. In the $\alpha$-type the intensities of the both absorptions are almost equal but in the $\delta$-type there is no absorption at 1698 cm.$^{-1}$ while in the $\alpha$-$\delta$-type there is a mean absorption at 1698 cm.$^{-1}$ between the other two types in addition to 1720 cm.$^{-1}$. The $\alpha$-$\delta$-type has the highest polymerization activity. The mixture of the $\alpha$- and $\delta$-type is next most active after the $\alpha$-$\delta$-type. On the other hand the $\alpha$-type is somewhat less active and the $\delta$-type is the least active. Accordingly it is preferred in carrying out this invention to utilize the BHCE having the $\alpha$-$\delta$-type, the mixture of the $\alpha$- and $\delta$-type or the $\alpha$-type crystalline form.

In carrying out the process of this invention, BCE is added to BHCE in such amounts as to provide a mole ratio of —COOCH$_2$CH$_2$OH to —COOH of about 1.0 to 4.0, preferably 1.0 to 3.0, and the obtained mixture is heated at a temperature of from 250 to 300° C. under a pressure of from the atmospheric to 30 kg./cm.$^2$, preferably the atmospheric to 20 kg./cm.$^2$ to approximate the mole ratio of —COOCH$_2$CH$_2$OH to —COOH of above 1 to 1 as much as possible and at the same time to give a substantially homogeneous reaction mixture. This reaction is referred to as the pretreating reaction in this description. This pretreating reaction is initiated usually as a heterogeneous reaction and, in the meantime, the esterification reaction takes place mainly and the apparent deethyleneglycolization reaction decreases. This is attributed to the fact that the equilibrium constant of the esterification reaction between BCE and the terminal hydroxyethyl group, i.e. —COOH$_2$CH$_2$OH and ethyleneglycol is nearly equal and the equilibrium constant is 2 or 3 times larger than that between terephthalic acid and ethyleneglycol. In this pretreating reaction ethyleneglycol may be positively distilled off from the reaction system provided that the mole ratio of —COOCH$_2$CH$_2$OH to —COOH is approximated from 1 to above 1 as much as possible. Also, by the subsequent polycondensation reaction may be accelerated by the relative increase of the terminal carboxy group, i.e. —COOH, without distilling off ethyleneglycol under high pressures. The primary object of the pretreating reaction is to approximate the mole ratio of —COOCH$_2$CH$_2$OH to —COOH of above 1 to 1 as much as possible and to give a homogeneous reaction system to such an extent as not hinder the subsequent polycondensation. The pretreating reaction is completed in about 1 to 3 hours.

Although this invention comprises adding BCE to BHCE as described above, at least one of the aliphatic dicarboxylic acid of the formula;

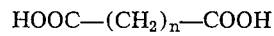

HOOC—(CH$_2$)$_n$—COOH (wherein $n$ is 1 to 8) may be employed instead of BCE or together with BCE up to 10 mole percent so long as the conditions required for the concentration of —COOCH$_2$CH$_2$OH and —COOH groups in the system as required above is filled. The group —(CH$_2$)$_n$— in the above formula may have a branched hydrocarbon chain with at most 3 carbon atoms. Exemplary aliphatic acids include malonic acid, succinic acid, glutaric acid, adipic acid, pimeric acid, suberic acid, azelaic acid, sebacic acid, methylsuccinic acid, $\alpha$-methylglutaric acid and $\beta$-methylglutaric acid.

In the subsequent polycondensation reaction process, the reaction product obtained in the pretreating reaction is heated at a temperature of 250 to 300° C., preferably 270 to 295° C. under a reduced pressure of below 5 mm. Hg, preferably 1 mm. Hg and, if desired, with the produced water and ethyleneglycol being distilled off from the reaction system until a reduced viscosity of the resulting polymers attains above 0.6. As the mole ratio of —COOCH$_2$CH$_2$OH to —COOH is as much as possible above approximately 1 to 1, the polycondensation reaction according to this invention inevitably consists of deethyleneglycolization, condensation and dehydration and it is most advantageous to maintain the dehydration condensation prevailing over the other in the polycondensation. When the heating time is plotted against the elevation of viscosity, the plots of the viscosities fall on an S-shaped curve, that is, they rise gradually in the beginning of polycondensation, than rise rapidly and gradually in the latter period of polycondensation. The period between the gradual viscosity rise in the beginning and the subsequent rapid viscosity rise is shortened as the mole ratio of —COOCH$_2$CH$_2$OH to —COOH is increased from above about 1 to 1. When the mole ratio is below 1, it is difficult to get a desired viscosity increase due to —COOH prevailing over —COOCH$_2$CH$_2$OH.

The present invention may also be employed for producing the copolymers of polyethylenediphenoxyethane-4,4'-dicarboxylate. A small amount of at least one comonomer such as other glycols, dicarboxylic acids, esters thereof, hydroxycarboxylic acids and esters thereof may be added in the course of producing the polyesterethers. Thus, the polyesterethers substantially comprising polyethylenediphenoxyethane-4,4'-dicarboxylate may contain up to 10 mole percent glycol such as diethyleneglycol, tetramethyleneglycol and hexamethyleneglycol or up to 10 mole percent dicarboxylic acid such as hexahydroterephthalic acid, isophthalic acid, dimethylterephthalic acid, naphthalic acid, diphenic acid, adipic acid, sebacic acid, azelaic acid and esters thereof.

It has been found valuable to introduce into the condensation process prior to the polycondensation, as molecular weight modifier, at least one of the compounds of the following formulae;

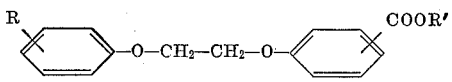

and

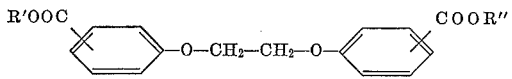

(wherein R is hydrogen atom, alkyl or alkoxy group; R' is hydrogen atom or —CH₂—CH₂—OH group; and R" is alkyl).

Exemplary molecular weight modifiers include 1,2-bis-(p-carboxyphenoxy)ethane monoethyleneglycol ester; 1,2-bis(p-carboxyphenoxy)ethane monomethyl ester, 1,2-bis-(p-carboxyphenoxy)ethane monoethyl ester, 1,2-bis(p-carboxyphenoxy)ethane mononorpropyl ester, 1,2-bis(p-carboxyphenoxy)ethane mono-iso-propyl ester and monoethyleneglycol esters thereof; p-carboxy-1,2-diphenoxyethane, p-carboxy-O'-methyl-1,2-diphenoxyethane, p-carboxy-m'-methyl-1,2-diphenoxyethane, p-carboxy-p'-methyl-1,2-diphenoxyethane, p-carboxy-p'-ethyl-1,2-diphenoxyethane, p-carboxy-p'-nor-propyl - 1,2 - diphenoxyethane, p-carboxy-p'-iso-propyl-1,2-diphenoxyethane, p-carboxy-p'-methoxy-1,2-diphenoxyethane, p-carboxy-p'-methoxy-1,2-diphenoxyethane, p-carboxy-p'-ethoxy-1,2-diphenoxyethane, and monoethyleneglycol esters thereof.

It is preferred to employ about 0.1 to 10 mole percent molecular weight modifier based on the BCE or the BHCE.

As unexpected effects in utilizing such molecular weight modifiers, the spinnability, transparency, luster and other properties of the polymer products have been remarkedly improved. Regarding the spinnability, the draftability in extruding the polymer products from a spinning nozzle and the subsequent heat stretching are improved and the obtained yarns show an excellent transparency and luster with an increase of tensile strength and elongation as well as of knot strength and elongation.

In general in producing a polymer the most difficult problem is to control the molecular weight of the polymer, which may vary widely depending upon the polymerization conditions. The above-described compounds have solved this problem and the molecular weight of the polymer products of this invention can also be controlled by controlling the amount of said compounds used.

The polymer products according to this invention have an excellent thermal stability and whiteness even compared with those containing at most 0.03% by weight of antimony metal as catalyst which are produced with maximum care so as to reduce the usual grey color as much as possible. However, stabilizers may also be employed in this invention. Due to the absence of a polycondensation catalyst to be blocked with a stabilizer in this process, such stabilizers give a sufficient stabilizing effect in small amounts. These are exemplified by known phosphorus compounds including, for example, phosphoric acid, phosporous acid, hypophosporous acid and alkali or alkali earth metal salts, ammonium salts thereof and alkyl or aryl ester thereof, such as triphenylphosphite and tricresylphosphite. It is noted that such stabilizers must be added to the reaction after the completion of the pretreating reaction. When they are present in the pretreating reaction, the polycondensation rate is not fully accelerated, but when they are added after the completion of the pretreating reaction a sufficient stabilizing effect is exhibited without lowering the polycondensation rate.

Additionally the transparency, the freshness of a color tone after dyeing and the spinnability of the present polymer products are remarkably improved compared with those in the prior art.

This invention will be illustrated by the following examples which are in no way limiting upon the scope hereof. Parts and percentages are by weight and viscosities are reduced viscosities measured at 35° C. at a concentration of 0.2 g. per 100 cc. in a 1:2 by weight mixture of phenol and tetrachlorethane unless expressly slated to the contrary.

EXAMPLE 1

In an autoclave there were placed 302 parts of BCE and 124 parts of ethyleneglycol and the esterification reaction mixture was held at 240° C. for 3.5 hours in the closed system. Then, while ventilating, the produced water and unreacted ethyleneglycol were distilled off to reduce amount of ethyleneglycol to 3.5%. The concentration of the carboxy group in the reaction product was reduced to 11% compared with that before the esterification. To the resulting mixture there was added 154 parts of BCE and the reaction was maintained at 285° C. for 50 minutes under pressure of 20 kg./cm.² of nitrogen. The mole ratio of —COOCH₂CH₂OH to —COOH was 1.05. To the obtained reaction product there was added 2.0% of titanium dioxide dispersed in ethyleneglycol, as delustering agent, and the polycondensation was carried out at 285° C. under a reduced pressure of 0.2 mm. Hg for 2 hours. Subsequently the polymer product was isolated. The polymer had a melting point of 250° C. and a reduced viscosity of 0.75 and was excellent in whiteness.

COMPARATIVE EXAMPLE 1

Only the amount of ethyleneglycol in the feeding composition was changed to 68 parts from 124 parts in Example 1 and the esterification was held in the same manner as in Example 1. Then while ventilating, the water and ethyleneglycol in the reaction system were distilled off and the degree of esterification was found 46% and the mole ratio of —COOCH₂CH₂OH to —COOH was below 1 measured from the change of the carboxy group in the esterification system. The obtained reaction product was subjected to the polycondensation at 285° C. under a reduced pressure of 0.1 mm. Hg for 8 hours to give a polymer having a reduced viscosity of only 0.32.

EXAMPLE 2

In an autoclave there were placed 302 parts of BCE and 256 parts of ethyleneglycol and the esterification was held at 240° C. for 5 hours under a pressure of 4 kg./cm.² of nitrogen with the produced water being distilled off. Then while ventilating, the unreacted ethyleneglycol was distilled off and the degree of esterification was 98% measured from the remaining amount of the carboxy group in the reaction product. To the obtained mixture there was added 163 parts of BCE and the reaction was maintained at 285° C. under a pressure of 12 kg./cm.² of nitrogen for 50 minutes and the mole ratio of —COOCH₂CH₂OH to —COOH was 1.05. The resulting reaction product was subjected to the polycondensation at 280° C. under a reduced pressure of 0.1 mm. Hg for 2.5 hours and subsequently the polymer product was isolated. The polymer had a melting point of 251° C. and a reduced viscosity of 0.81 and was excellent in whiteness.

COMPARATIVE EXAMPLE 2

To the esterification reaction product in Example 2 there was added 305 parts of BCE and in the same manner as in Example 2 the pretreating reaction was held and the mole ratio of —COOCH₂CH₂OH to —COOH was 0.95. The resulting reaction product was subjected to the polycondensation in the same manner as in Example 2 to give a polymer having a reduced viscosity of only 0.37.

On the other hand, to the esterification reaction product in Example 2 there was added 30 parts of BCE, and in the same manner as in Example 2 the pretreating reaction was held and the mole ratio of

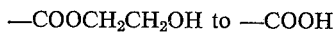

—COOCH₂CH₂OH to —COOH
was 1.70. The resulting reaction product was subjected to polycondensation at 280° C. under a reduced pressure of 0.1 mm. Hg for 3 hours to give a polymer having a reduced viscosity of only 0.41.

EXAMPLE 3

In an autoclave there were placed 302 parts BCE and 102 parts of ethyleneglycol and the esterification was held at 240° C. for 4 hours in the closed system. Then the produced water and unreacted ethyleneglycol were distilled off to reduce the amount of ethyleneglycol to 3.2% in the reaction system, and the concentration of the carboxy group in the resulting reaction mixture was 30% mole. To the obtained reaction mixture there was added 30 parts of BCE, and the reaction was maintained at 280° C. for 40 minutes under a pressure of 10 kg./cm.² of nitrogen. The mole ratio of

—COOCH₂CH₂OH to —COOH was found 1.04. Then this reaction product was subjected to the polycondensation at 285° C. and 2.5 hours under a reduced pressure of 5 mm. Hg in a nitrogen stream, and the polymer product was isolated. The polymer had a melting point of 250° C. and a reduced viscosity of 0.84 and was excellent in whiteness.

EXAMPLE 4

In carrying out the pretreating reaction with the addition of BCE to the esterification reaction product in Example 1, the reaction temperature was varied in the range of from 260 to 300° C. for determining the required reaction time, and the subsequent polycondensation was maintained at 285° C. under a reduced pressure of 0.1 mm. Hg for 3 hours until a reduced viscosity of the polymer product attains 0.7. In the following Table I there is given the reaction time required for obtaining a polymer product having a reduced viscosity of 0.7 in the subsequent polycondensation held at 285° C. under a reduced pressure of 0.1 mm. Hg for 3 hours.

TABLE I

| Pretreating reaction temperature (° C.): | Required reaction time (minutes) |
|---|---|
| 260 | 90 |
| 270 | 41 |
| 280 | 30 |
| 290 | 22 |
| 300 | 15 |

The required reaction time also depends upon the amount of BCE, and the reaction time is shortened as the amount is smaller. The pretreating reaction temperature above 300° C. introduces discoloration to the polymer products.

EXAMPLE 5

In a glass autoclave there was added the esterification reaction product in Example 1, and the pretreating reaction was held at 270° C. for 30 minutes under a pressure of 10 kg./cm.² in the closed system to give a faint opaque reaction product. The mole ratio of —COOCH₂CH₂OH to —COOCH was found to be 1.07. The resulting reaction product was transferred to a polymerization flask and the temperature was raised to 285° C. over 30 minutes to give an almost transparent homogeneous reaction system. Then the resulting reaction product was subjected to the polycondensation at 285° C. under a reduced pressure of 0.2 mm. Hg for 3 hours to give a polymer product having a melting point of 250° C. and reduced pressure of 0.85 and being excellent in whiteness.

EXAMPLE 6

In an autoclave there were placed 302 parts of BCE, 7.3 parts of adipic acid and 124 parts of ethyleneglycol, and the esterification was held at 240° C. for 3 hours in the closed system. Then the produced water and unreacted ethyleneglycol were distilled off, and the concentration of the carboxy group in the resulting reaction mixture was reduced to 12% mole compared with that before the reaction. To the obtained mixture there was added 154 parts of BCE and the pretreating reaction was maintained at 285° C. for 50 minutes under 15 kg./cm.² of nitrogen and the mole ration of

—COOCH₂CH₂OH to —COOH was found 1.06. The obtained reaction mixture was heated to 285° C. and subjected to the polycondensation maintained at 285° C. under a reduced pressure of 0.2 mm. Hg for 2 hours, and the polymer product was isolated. The polymer had a melting point of 242° C. and a reduced viscosity of 0.74 and was excellent in whiteness.

EXAMPLE 7

To 326 parts of BCE, 10.89 parts (i.e. 3 mole percent based on the BCE) of p-carboxy-p′ - methyl - 1,2-diphenoxyethane and 155 parts of ethyleneglycol, there was added 0.065 part of calcium oxide, and the obtained mixture was heated at 195° C. for 4 hours with stirring until 98% of theory of methanol was distilled off. Then the temperature was raised to 260° C. to distill off ethyleneglycol, and the amount of ethyleneglycol in the reaction system was reduced to 3.5%. To the obtained reaction mixture there was added 290 parts of BCE, and the pretreating reaction was maintained at 285° C. for 50 minutes under a pressure of 20 kg./cm.² of nitrogen and the mole ratio of —COOCH₂CH₂OH to —COOH was found 1.05. To the obtained reaction product there were added 0.2 part of triphenyl phosphate and 2.0% of titanium dioxide dispersed in ethyleneglycol as delustering agent and the polycondensation was maintained at 285° C. under a reduced pressure of 0.2 mm. Hg for 2 hours. Then the polymer product was isolated. The polymer had a melting point of 250° C. and a reduced viscosity of 0.73 and was excellent in whiteness.

EXAMPLE 8

BHCE was prepared by reacting BCE with 3 moles of ethylene oxide and 16 moles of water per mole BCE and purified by recrystallization from dichloroethane. To 329 parts of the resulting BHCE there was added 290 parts of BCE and the pretreating reaction was held at 280° C. for 40 minutes. The mole ratio of —COOCH₂CH₂OH to —COOH was found 1.07. To the obtained reaction product there was added 10 parts of 1,2-bis(p-carboxyphenoxy)ethane monoethylmonoglycol ester, and the polycondensation reaction was maintained at 285° C. under a reduced pressure of 0.2 mm. Hg. The purity effect of BHCE on the reduced viscosity of the obtained polymer product in the 2-hour polycondensation is shown in Table II.

TABLE II

| Purification: | Reduced viscosity in 2-hour polycondensation |
|---|---|
| One-time recrystallization [1] | 0.34 |
| Four-time recrystallization [2] | 0.75 |

[1] $k_{258}=4.05\times10^4$ (l. cm./mole); $k_{280}=3.57\times10^3$ (l. cm./mole).
[2] $k_{258}=4.46\times10^4$ (l. cm./mole); $k_{280}=4.06\times10^3$ (l. cm./mole).

EXAMPLE 9

The BHCE purified by 4-time recrystallization from dichloroethane in Example 8 having the infrared absorptions at 1720 cm.⁻¹ was stronger than that of 1698 cm.⁻¹, which was characteristic of the α-δ-type crystalline form. When this BHCE was recrystallized again from methanol, the resulting BHCE had the infrared absorptions at 1720 cm.⁻¹ and 1698 cm.⁻¹ with the almost equal intensities characteristic of the α-type. On the other hand when the methanol containing equimolecular urea based on the BHCE was employed as a purification medium, the resulting BHCE had an infrared absorption at only 1720 cm.$^{-1}$ characteristic of the δ-type. The polycondensation was carried out using the BHCE's having these 3 crystalline forms in the same manner as in Example 8, and the effect of the crystalline form on the reduced viscosity of the obtained polymer products is shown in Table III.

TABLE III

| Crystalline form: | Reduced viscosity in 2-hour polycondensation at 280° C. |
|---|---|
| α-Type | 0.65 |
| α-Type | 0.47 |
| δ-α-Type | 0.76 |
| Equimolar mixture of α- and δ-types | 0.75 |

EXAMPLE 10

In an autoclave there were placed 326 parts of BCE, 7.3 parts of adipic acid, 155 parts of ethyleneglycol and 0.07 part of calcium oxide, and the obtained mixture was held at 195° C. for 5 hours with the produced methanol being distilled off, and subsequently the unreacted ethyleneglycol was distilled off. To the resulting reaction mixture, there was added 290 parts of BCE, and the pretreating reaction was held at 285° C. under 15 atmospheric pressure in a nitrogen atmosphere, and the mole ratio of —COOCH$_2$CH$_2$OH to —COOH was found to be 1.06. To the obtained reaction mixture, there was added 3 mole percent, based on the BCE of p-carbomethoxy - 1,2 - diphenoxyethane, and the temperature was raised to 285° C. and the polycondensation was maintained at 285° C. under a reduced pressure of 0.2 mm. Hg to give a polymer having a melting point of 242° C. and a reduced pressure of 0.71. The polymer was excellent in whiteness.

EXAMPLE 11

Using the BHCE recrystallized four times from dichloroethane and p-carboxy-1,2-diphenoxyethane instead of 1,2 - bis(p-carboxyphenoxy)ethane monoethylmonoglycol ester in Example 8, the polycondensation reaction was maintained at 280° C. under a reduced pressure of 0.2 mm. Hg. The effect of the amount of molecular weight modifier on the reduced viscosity of the polymer obtained in the 5-hour polycondensation is shown in Table IV.

TABLE IV

| Amount of molecular weight modifier, mole percent: | Reduced viscosity in 5-hour polycondensation |
|---|---|
| 0 | Gelled |
| 2 | 0.952 |
| 3 | 0.811 |
| 5 | 0.605 |

What is claimed is:

1. A process for producing linear polyesterethers containing at least 90 mole percent of the unit of the formula:

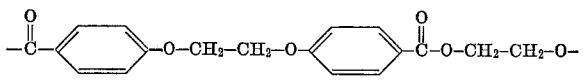

based upon the recurring unit in the molecular chain, which comprises adding 1.2-bis(p. barboxy-phenoxy)-ethane to 1,2-bis[p-(β-hydroxycarboethoxy) - phenoxy] ethane in such amounts as to provide a mole ratio of —COOCH$_2$CH$_2$OH to —COOH of about 1.0 to 4.0, heating the obtained mixture at a temperature of from 250 to 300° C. under a pressure of from atmospheric pressure to 30 kg./cm.$^2$ to maintain the said mole ratio above about 1 to 1 as much as possible, and polycondensing the obtained reaction product at elevated temperatures under reduced pressure in the absence of any polycondensation catalyst.

2. The process of claim 1, wherein the 1,2-bis[p-(β-hydroxycarboethoxy)-phenoxy]ethane is selected from the group consisting of the reaction product mixture obtained by the direct esterification of 1,2-bis(p-carboxyphenoxy)-ethane and ethyleneglycol and the reaction product mixture obtained by the ester exchanger reaction of 1,2-bis (p-carboxyphenoxy)ethane and ethyleneglycol.

3. The process of claim 1, wherein the 1,2-bis[p-(β-hydroxycarboethoxy)-phenoxy]ethane is purified to such an extent to have the following molecular absorption coefficient k with the wave lengths of 258 and 280 mμ as the ultraviolet absorption range character:

$k258 = (4.48 \pm 0.20) \times 10^4$ (l. cm./mole)

and $k280 = (4.04 \pm 0.20) \times 10^3$ (l. cm./mole)

4. The process of claim 1, wherein at least one of the compounds having the formulae:

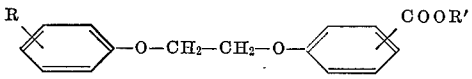

and

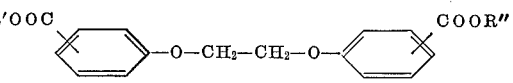

wherein R is selected from the group consisting of hydrogen atoms, alkyl and alkoxy group; R' is selected from the group consisting of hydrogen atom and

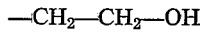

group; R'' is an alkyl group is present in the polycondensation reaction system as molecular weight modifier.

5. The process of claim 1 wherein a phosphorus compound stabilizer selected from the group consisting of phosphoric acid, phosphorus acid, hypophosphorous acid, alkali metal salts, alkali earth metal salts ammonium salts of phosphoric acid, phosphorous acid, hypophosphorous acid, triphenyl phosphite, tricesyl phosphite and triphenyl phosphate is present in the polycondensation reaction system.

6. The process of claim 1, wherein at least one of the aliphatic dicarboxylic acids of the formula:

wherein n is an integer of 1 to 8; and wherein the alkylene group —(CH$_2$)$_n$— may have a branched hydrocarbon chain thereon with at most 3 carbon atoms and is added in amounts of at most 10 mole percent instead of 1,2-bis(p-carboxyphenoxy) ethane.

7. The process of claim 1, wherein at least one of the aliphatic dicarboxylic acids of the formula:

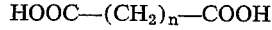

wherein n is an integer of 1 to 8; and the alkylene group —(CH$_2$)$_n$— may have a branched hydrocarbon chain with at most 3 carbon atoms and is added in amounts of at most 10 mole percent together with 1,2-bis(p-carboxyphenoxy)-ethane.

References Cited

UNITED STATES PATENTS

| 2,799,665 | 7/1957 | Lincoln | 260—47 |
| 2,828,290 | 3/1958 | Caldwell | 260—76 |
| 3,378,523 | 4/1968 | Caldwell et al. | 260—47 |
| 3,381,057 | 4/1968 | Senoo et al. | 260—860 |

HAROLD D. ANDERSON, Primary Examiner

L. M. PHYNES, Assistant Examiner

U.S. Cl. X.R.

260—47

UNITED STATES PATENT OFFICE
CERTIFICATE OF CORRECTION

Patent No. 3,551,380          Dated December 29, 1970

Inventor(s) Hidehiko Kobayashi et al.

It is certified that error appears in the above-identified patent and that said Letters Patent are hereby corrected as shown below:

Column 4, line 1, "COOH$_2$" should read -- COOCH$_2$ --.

Column 5, line 59, "phosporous" should read -- phosphorous -- same line 59, "hypophosporous" should read -- hypophosphorous Column 6, line 4, "slated" should read -- stated --; line 13, after "reduce" insert -- the --. Column 7, line 62, "COOCH", second occurrence, should read -- COOH --. Column 9, line 13, "α-Type" should read -- δ-Type --; lines 62 and 63, "(p. barboxy-phenoxy)-ethane" should read -- (p-carboxy-pheno: ethane --; line 71, "pressure" should read -- pressures --. Column 10, line 38, "tricesyl" should read -- tricresyl --.

Signed and sealed this 4th day of May 1971.

(SEAL)
Attest:

EDWARD M.FLETCHER,JR.
Attesting Officer

WILLIAM E. SCHUYLER, .
Commissioner of Patent